(12) United States Patent
Jordan, Jr.

(10) Patent No.: US 7,187,921 B1
(45) Date of Patent: Mar. 6, 2007

(54) APPARATUS, SYSTEM AND METHOD FOR FORWARDING DATA SENT TO A WIRELESS DEVICE TO ANOTHER ADDRESS

(75) Inventor: Royce D. Jordan, Jr., Lawrenceville, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 347 days.

(21) Appl. No.: 10/097,310

(22) Filed: Mar. 14, 2002

Related U.S. Application Data

(60) Provisional application No. 60/339,975, filed on Dec. 10, 2001.

(51) Int. Cl.
*H04L 12/58* (2006.01)
*H04Q 7/20* (2006.01)

(52) U.S. Cl. ............... 455/412.1; 455/433; 455/435.1; 455/556.2; 709/206; 709/245; 379/93.24

(58) Field of Classification Search ............... 709/288, 709/250
See application file for complete search history.

(56) References Cited

U.S. PATENT DOCUMENTS

| | | | |
|---|---|---|---|
| 5,559,800 A | | 9/1996 | Mousseau et al. |
| 5,903,845 A | * | 5/1999 | Buhrmann et al. .......... 455/461 |
| 6,208,854 B1 | * | 3/2001 | Roberts et al. ............. 455/417 |
| 6,208,998 B1 | * | 3/2001 | Marcus .................... 707/104.1 |
| 6,219,694 B1 | | 4/2001 | Lazaridis et al. |
| 6,353,852 B1 | * | 3/2002 | Nestoriak et al. ........... 709/206 |
| 6,463,462 B1 | * | 10/2002 | Smith et al. ................ 709/206 |
| 6,678,361 B2 | * | 1/2004 | Rooke et al. ............ 379/93.24 |
| 2001/0037407 A1 | * | 11/2001 | Dragulev et al. .......... 709/250 |
| 2002/0087704 A1 | * | 7/2002 | Chesnais et al. ........... 709/228 |
| 2002/0167488 A1 | * | 11/2002 | Hinckley et al. ........... 345/156 |

* cited by examiner

*Primary Examiner*—Fan Tsang
*Assistant Examiner*—Lisa Hashem
(74) *Attorney, Agent, or Firm*—Thomas, Kayden, Horstemeyer & Risley

(57) ABSTRACT

An apparatus for forwarding data sent to a wireless device having a first address to a second address. The apparatus includes a server in communication with a wireless network and an external network. The server includes a processor. The processor includes a data forwarding module for forwarding the data to the second address via the external network when the wireless device is not in communication with the wireless network.

17 Claims, 6 Drawing Sheets

APPARATUS, SYSTEM AND METHOD FOR FORWARDING DATA SENT TO A WIRELESS DEVICE TO ANOTHER ADDRESS

CROSS-REFERENCE TO RELATED APPLICATION

This application claims priority under 35 U.S.C. § 119(e) to U.S. Provisional Patent Application No. 60/339,975 filed Dec. 10, 2001.

BACKGROUND

A user of a wireless device associated with a wireless network may employ the wireless device to send and receive data via the wireless network while the wireless device is in communication with the wireless network. However, when a user of the wireless device turns the wireless device off, or the wireless device is outside an area covered by the wireless network, the user loses the ability to send and receive data via the wireless network. If data are sent to the user while the wireless device is not in communication with the wireless network, the data will not be delivered to the user via the wireless device until the wireless device is turned on and is in a geographic area served by the wireless network. As a result, the user may be unaware of the sent data for an unacceptable period of time. Thus, there exists a need for an apparatus, system and method for forwarding data sent to a wireless device to another address when the wireless device is not in communication with the wireless network.

SUMMARY

According to one embodiment, the present invention provides an apparatus for forwarding data sent to a wireless device having a first address to a second address. The apparatus includes a server in communication with a wireless network and an external network, wherein the server includes a processor. The processor includes a data forwarding module for forwarding the data to the second address via the external network when the wireless device is not in communication with the wireless network.

According to another embodiment, the invention provides an apparatus for editing a profile of a user associated with a wireless network. The apparatus includes a database machine in communication with the wireless network. The database machine includes a processor, and the processor includes an edit request module for receiving a request to alter the profile of the user and an update module for altering the profile of the user.

According to another embodiment, the invention provides a system for forwarding data sent to a wireless device having a first address to a second address. The system includes a gateway in communication with a wireless network and an external network, wherein the gateway includes a server. The server includes a processor, and the processor includes a data forwarding module for forwarding the data to the second address via the external network when the wireless device is not in communication with the wireless network.

According to another embodiment, the invention provides a system for editing a profile of a user associated with a wireless network. The system includes a gateway in communication with the wireless network, wherein the gateway includes a database machine. The database machine includes a processor, and the processor includes an edit request module for receiving a request to alter the profile of the user and an update module for altering the profile of the user.

According to another embodiment, the invention provides a method for forwarding data sent to a wireless device having a first address to a second address. The method includes receiving data sent to the first address, the data having a header portion that identifies the first address as a data delivery address, modifying the data, and transmitting the modified data to the second address.

These and various other embodiments of the invention are pointed out with particularity in the claims annexed hereto and forming a part hereof. For a better understanding of the invention, however, reference should be made to the drawings which form a further part hereof, and to the accompanying descriptive matter, in which there are illustrated and described specific examples of an apparatus and method in accordance with the invention.

DESCRIPTION

It is to be understood that the figures and descriptions of the present invention have been simplified to illustrate elements that are relevant for a clear understanding of the present invention, while eliminating, for purposes of clarity, other elements of a conventional communications network. Those of ordinary skill in the art will recognize, however, that these and other elements may be desirable in a typical communications network. However, because such elements are well known in the art, and because they do not facilitate a better understanding of the present invention, a discussion of such elements is not provided herein.

Figure 1:
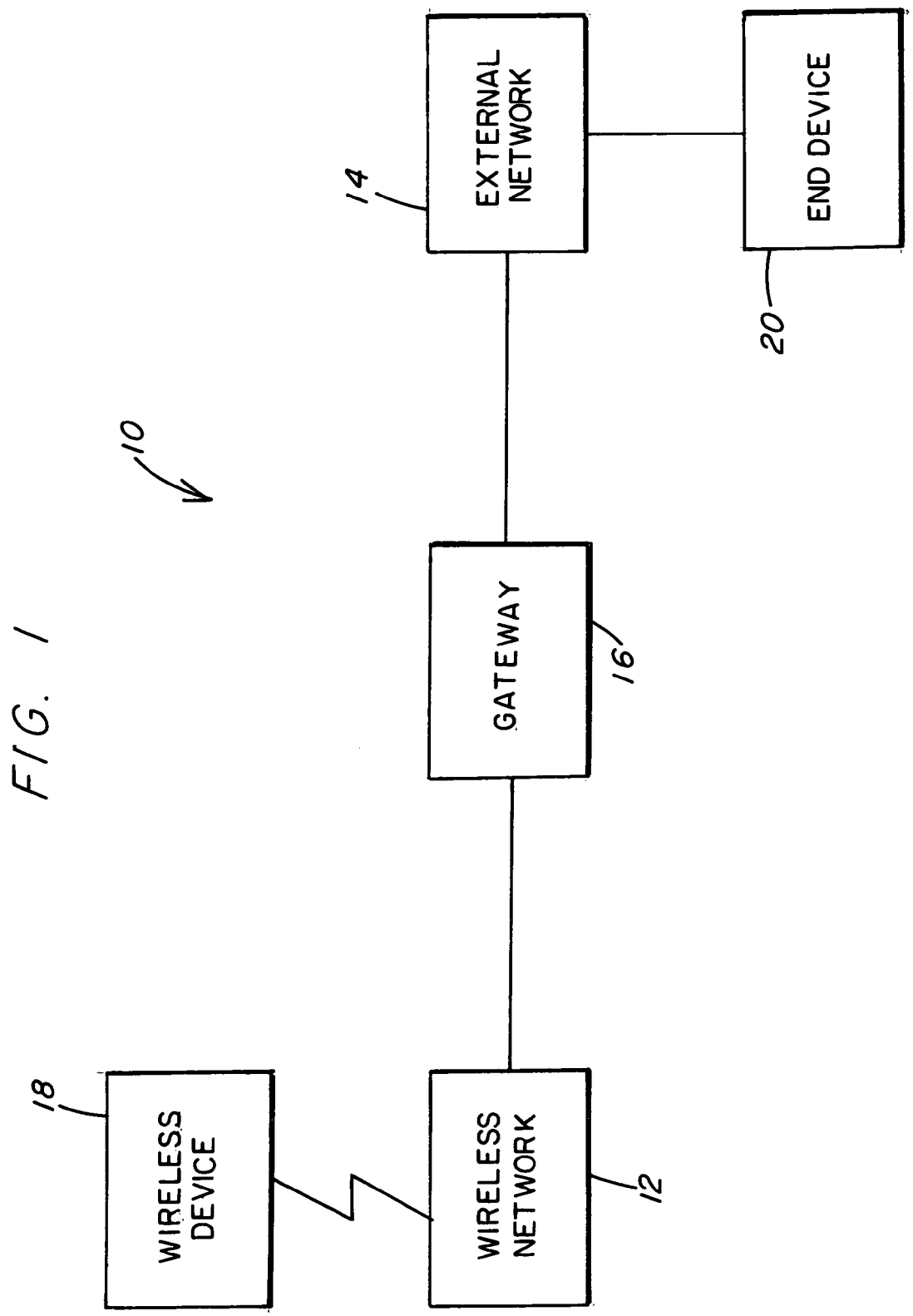
FIG. 1 illustrates a simplified block diagram of a system according to one embodiment of the present invention.

FIG. 1 illustrates a simplified block diagram of a system 10 according to one embodiment of the present invention. The system 10 may include a wireless network 12, an external network 14, and a gateway 16 in communication with the wireless network 12 and the external network 14.

The communications between the gateway 16 and the wireless network 12 may use, for example, the X.25 protocol. The wireless network 12 may also be in communication with a wireless device 18 such as, for example, a wireless pager, and may communicate with the wireless device 18 using an over-the-air protocol such as HP98 or the Blackberry protocol developed by RIM (Research in Motion). According to other embodiments, the wireless device 18 may be a personal digital assistant (PDA), a wireless telephone, a wireless personal computer, a wireless modem, or any wireless device configured to communicate with the wireless network 12. According to one embodiment, the wireless network 12 may be a Mobitex® network operated by Cingular Interactive, and the communications between the wireless device 18 and the wireless network 12 may be text messages. The wireless network 12 and the gateway 16 are described in more detail hereinbelow with respect to FIGS. 2 and 3, respectively.

The external network 14 may be any communication network other than the wireless network 12, and may be in communication with an end device 20. For example, the external network 14 may be a second wireless network, the Internet, or a telephone network such as the Public Switched Telephone Network (PSTN). According to another embodiment of the present invention, the system 10 may include a plurality of external networks 14, and each external network 14 may be in communication with the gateway 16. Thus, the communication between the gateway 16 and any one external network 14 may use, for example, the X.25 protocol, the TCP/IP protocol, or a Telocator Alphanumeric Protocol such as XTAP. The end device 20 may be, for example, a wireless device in communication with a second wireless network, a terminal or a computer in communication with the Internet, a telephone in communication with the PSTN, or a facsimile machine in communication with the PSTN.

Figure 2:
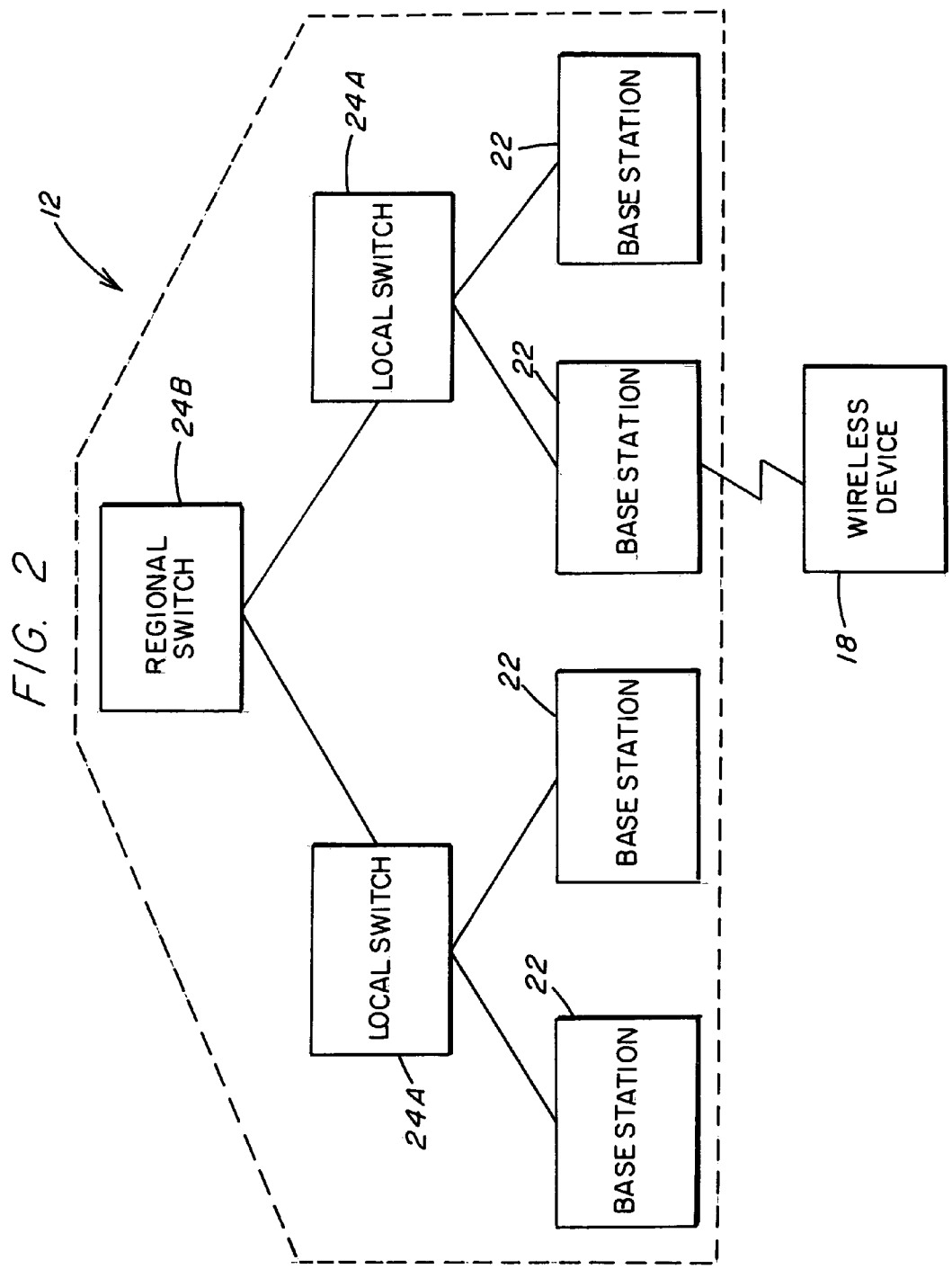
FIG. 2 illustrates one embodiment of the wireless network of FIG. 1.

FIG. 2 illustrates one embodiment of the wireless network 12 of FIG. 1. The wireless network 12 may include one or more radio base stations 22. Each radio base station 22 services a different radio cell, and each radio cell may have a diameter of approximately ten to twenty miles, depending on environmental and other conditions. The radio base stations 22 define the coverage area of the wireless network 12. In operation, the wireless device 18 communicates with its nearest base station 22, but is also able to communicate with other base stations 22 as its location changes. The wireless network 12 may also include one or more switches 24 that are organized in a hierarchy of local switches 24A and regional switches 24B connected to one another by fixed communication links. The switches 24 route communication traffic between the radio base stations 22, and one or more of the switches 24 may provide a connection to the gateway 16.

Figure 3:
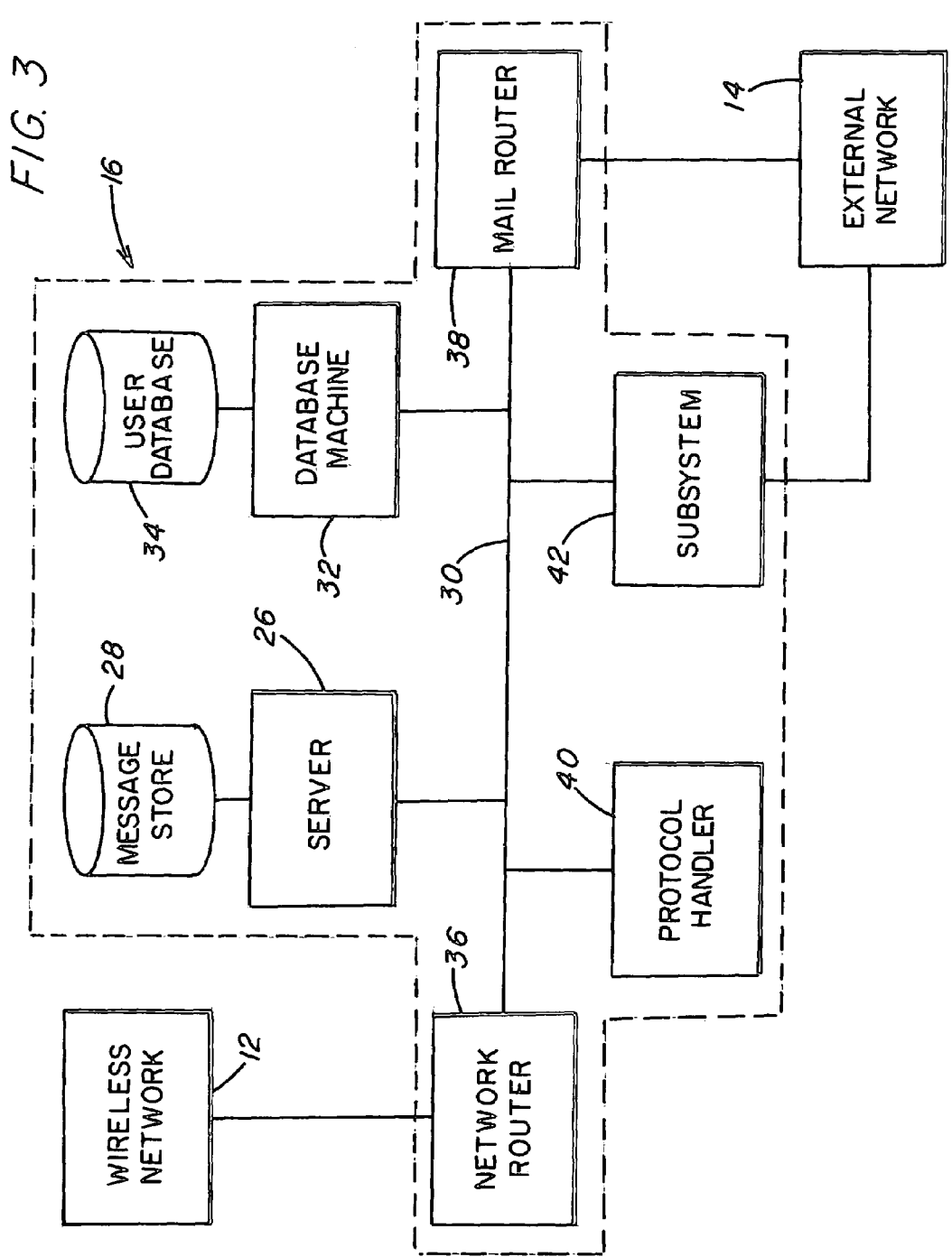
FIG. 3 illustrates one embodiment of the gateway of FIG. 1.

FIG. 3 illustrates one embodiment of the gateway 16 of FIG. 1. The gateway 16 includes a server 26 having a message store 28 associated therewith. The server 26 may be implemented as, for example, a network file system (NFS) server, and will be described in more detail hereinbelow with respect to FIG. 4.

The message store 28 is in communication with the server 26, and may be implemented as a database configured with a directory structure. The message store 28 may include a mailbox for storing data that has been sent to a wireless device 18 having a first address and associated with the wireless network 12. Data stored in the mailbox may include a data delivery address, and may be held in one or more of the fields of a record in the database. The message store 28 may also include a plurality of mailboxes, each mailbox being associated with a different user that is associated with the wireless network 12, and the directory structure may be used to identify a particular mailbox. The message store 28 may comprise a portion of the server 26 or may be located external to the server 26. According to one embodiment, the gateway 16 may also include a plurality of message stores 28, and each message store 28 may serve as a backup to the other message stores 28.

The gateway 16 may also include an internal network 30, a database machine 32 having a user database 34 associated therewith, a network router 36, a mail router 38, and a protocol handler 40. The internal network 30 may be connected to the server 26, the database machine 32, the network router 36, the mail router 38, and the protocol handler 40, and may, for example, be implemented as a local area network (LAN).

The database machine 32 may be implemented as a c-tree server manufactured by FairCom Corporation, and will be described in more detail hereinbelow with respect to FIG. 5. The user database 34 is in communication with the database machine 32, and may be configured with a directory structure. The user database 34 may include a profile associated with a user of the wireless network 12. Such a profile may include the name of the user, a password associated with the user, a user account number, a unique identifier such as, for example, a unique access number associated with the user, and a list of services subscribed to. The profile may also include a primary address, an alternate delivery address associated with the primary address, and a waiting time.

The primary address may be associated with the wireless device 18, and may indicate where the user wishes to receive data such as, for example, an e-mail message. The alternate delivery address may be associated with the end device 20, and may indicate where the user wishes to receive data addressed to the primary address when the wireless device 18 is turned off or is outside the coverage area of the wireless network 12. The primary address may have a plurality of alternate delivery addresses associated therewith. The waiting time may represent the minimum period of time that the user wishes to have data sent to the primary address remain undelivered before the data is forwarded to the alternate delivery address. For example, there may be instances when the user knows that the wireless device 18 will be turned off or outside the coverage area of the wireless network 12 for a relatively short period of time. In such instances, the waiting time may be set to prevent the data from being forwarded to an alternate delivery address.

The profile may be represented by data held in one or more fields of a record in the user database 34, and may be created or edited at any time. According to one embodiment, the user may send a message to the gateway 16, wherein the message includes information specifying the primary address to be associated with the wireless device 18, one or more alternate delivery addresses, and a value for the waiting time. The gateway 16 may then create or edit the profile according to the information included in the message. According to another embodiment, the user may send a message to the gateway 16, wherein the message includes information instructing the gateway 16 to enable or disable the data forwarding function of the present invention.

The user database 34 may also include a plurality of profiles, each profile being associated with a different user that is associated with the wireless network 12. The user database 34 may include a directory structure, and the directory structure may be used to identify a particular profile. The user database 34 may comprise a portion of the database machine 32 or may be located external to the database machine 32. According to one embodiment, the gateway 16 may include a plurality of database machines 32 that may serve as a backup to the other database machines 32. According to another embodiment of the present invention, the database machine 32 and the server 26 may be combined into a single computer (not shown) that is in communication with the message store 28, the user database 34, and the internal network 30.

The network router 36 is connected to the wireless network 12 and the internal network 30, and may use the X.25 protocol to communicate with one or more of the wireless network switches 24 via fixed communication links. The network router 36 may include up to two dual-ported connectivity cards. Thus, the network router 36 may include up to four fast-sequenced transport (FST) connections. The network router 36 may receive message packets from and send message packets to the wireless network 12. The network router 36 may also route the message packets received from the wireless network 12 to the protocol handler 40 via the internal network 30. Communications between the network router 36 and the protocol handler 40 may use the user datagram protocol (UDP) that comprises a part of the TCP/IP protocol suite. According to one embodiment, the gateway 16 may include up to 255 network routers 36, and each network router 36 may serve as a backup to the other network routers 36.

The mail router 38 may be connected to the Internet and the internal network 30, and may use the TCP/IP protocol to communicate with the Internet via a fixed communication link. The mail router 38 may receive message packets from and send message packets to the Internet. The mail router 38 may also route the message packets received from the Internet to the protocol handler 40 via the internal network 30. Communications between the mail router 36 and the protocol handler 38 may use the user datagram protocol (UDP). According to one embodiment, the gateway 16 may include a plurality of mail routers 38, and each mail router 38 may serve as a backup to the other mail routers 38.

The protocol handler 40 is connected to the internal network 30, and may process communications received by the gateway 16 from the wireless network 12 or the external network 14. The underlying protocol for decoding messages received from or packaging messages sent to the wireless network 12 and the external network 14 may be simple mail transfer protocol (SMTP). The protocol handler 40 may communicate with the server 26, the database machine 32, the network router 36 and the mail router 38 using X-sockets over internal network 30. Such sockets may be, for example, point-to-point, two-way software communications interfaces that direct the protocol handler 40 to access the internal network 30 by creating a communications end-point or socket and returning a file descriptor with which to access the socket. The protocol handler 40 may also maintain a database cache (not shown), i.e., a small, fast memory holding recently accessed data, to speed up internal network communications and to limit database access requests over the LAN.

The protocol handler 40 may handle protocols associated with the wireless network 12 and the external network 14. The protocol handler 40 may be a UNIX machine, and the protocols handled by the protocol handler 40 may specify that the storage of and access to data in the message store 28 may be handled by a UNIX-based network file system (NFS) that allows data to be shared across the internal network 30 regardless of the protocol. According to one embodiment, the gateway 16 may include a plurality of protocol handlers 40, and each protocol handler 40 may serve to back up the other protocol handlers 40.

The gateway 16 may also include one or more subsystems 42 that are in communication with the internal network 30 and an external network 14. The subsystems 40 may include, for example, a faxmail system, a pagemail system, a phonemail system, or an interactive voice response system (IVRS).

According to one embodiment, the gateway 16 may be configured as a standard Santa Cruz Operation (SCO) UNIX system. The gateway 16 may use both TCP/IP and UDP for communications, and hypertext markup language (HTML) may be used to support Internet web browsers, including those provided by Netscape and Microsoft. The application programs used by the gateway components may be written in, for example, the C programming language, Java or HTML.

Figure 4:
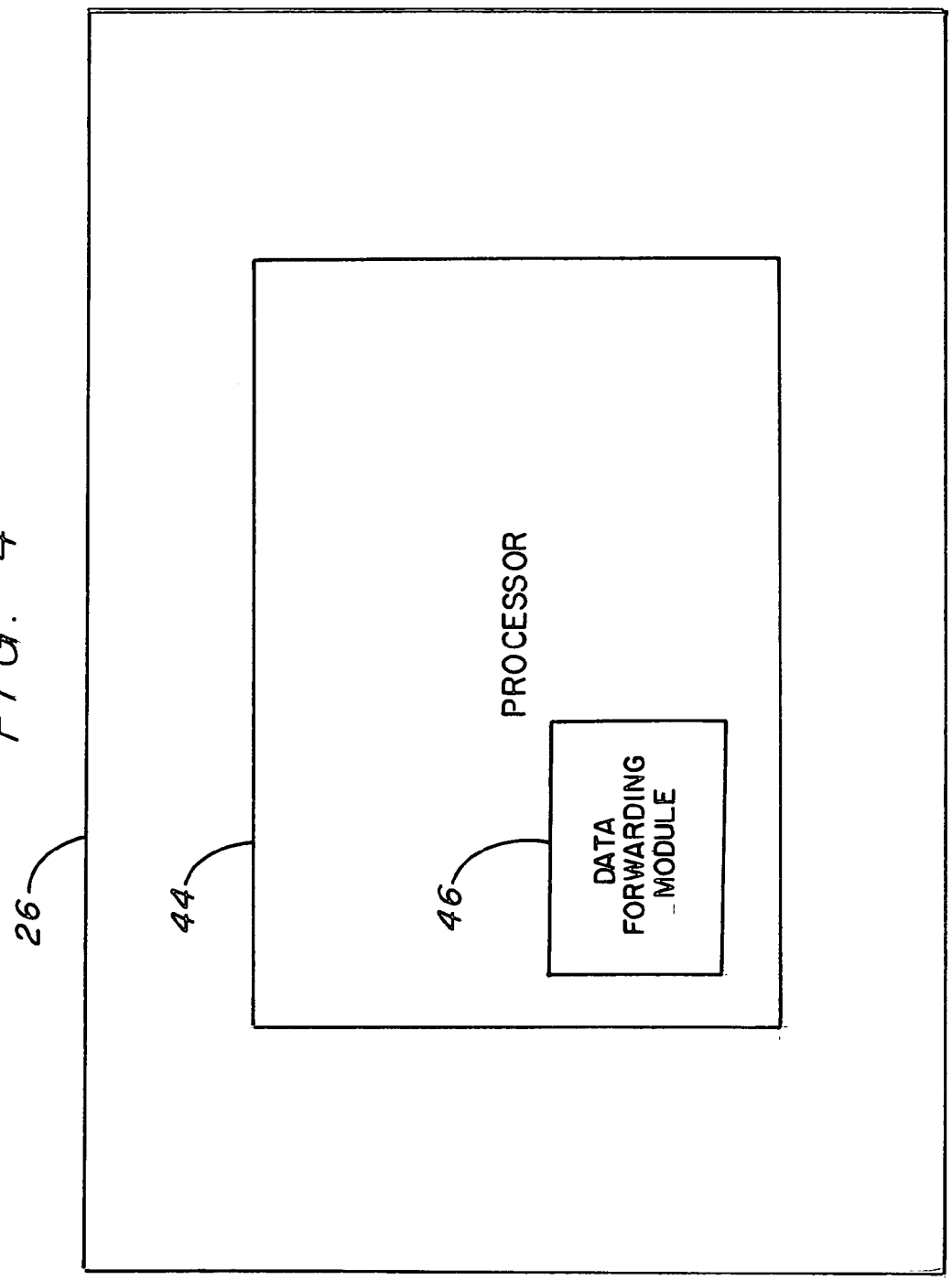
FIG. 4 illustrates one embodiment of the server of FIG. 3.

FIG. 4 illustrates one embodiment of the server 26 of FIG. 3. The server 26 may include a processor 44. The server 26 may also include an interface to content addressable memory (CAM) (not shown) for updating data stored in the message store 28. The processor 44 may be a central processing unit (CPU) including, e.g., a microprocessor, an application specific integrated circuit (ASIC), or one or more printed circuit boards. The processor 44 may include a data forwarding module 46 for forwarding data sent to a wireless device 18 having a first address to a second address via the external network 14 when the wireless device 18 is not in communication with the wireless network 12.

The data forward module 46 may be implemented, for example, as microcode configured into the logic of the processor 44, or may be implemented as programmable microcode stored in an electrically erasable programmable read only memory (EEPROM). According to another embodiment, the data forward module 46 may be implemented as software code to be executed by the processor 44. The software code may be written in any suitable programming language using any suitable programming technique. For example, the software code may be written in C using procedural programming techniques, or in Java or C++ using object-oriented programming techniques. The software code may be stored as a series of instructions or commands on a computer readable medium, such as a random access memory (RAM) or a read only memory (ROM), a magnetic medium such as a hard-drive or a floppy disk, or an optical medium such as a CD-ROM.

Figure 5:
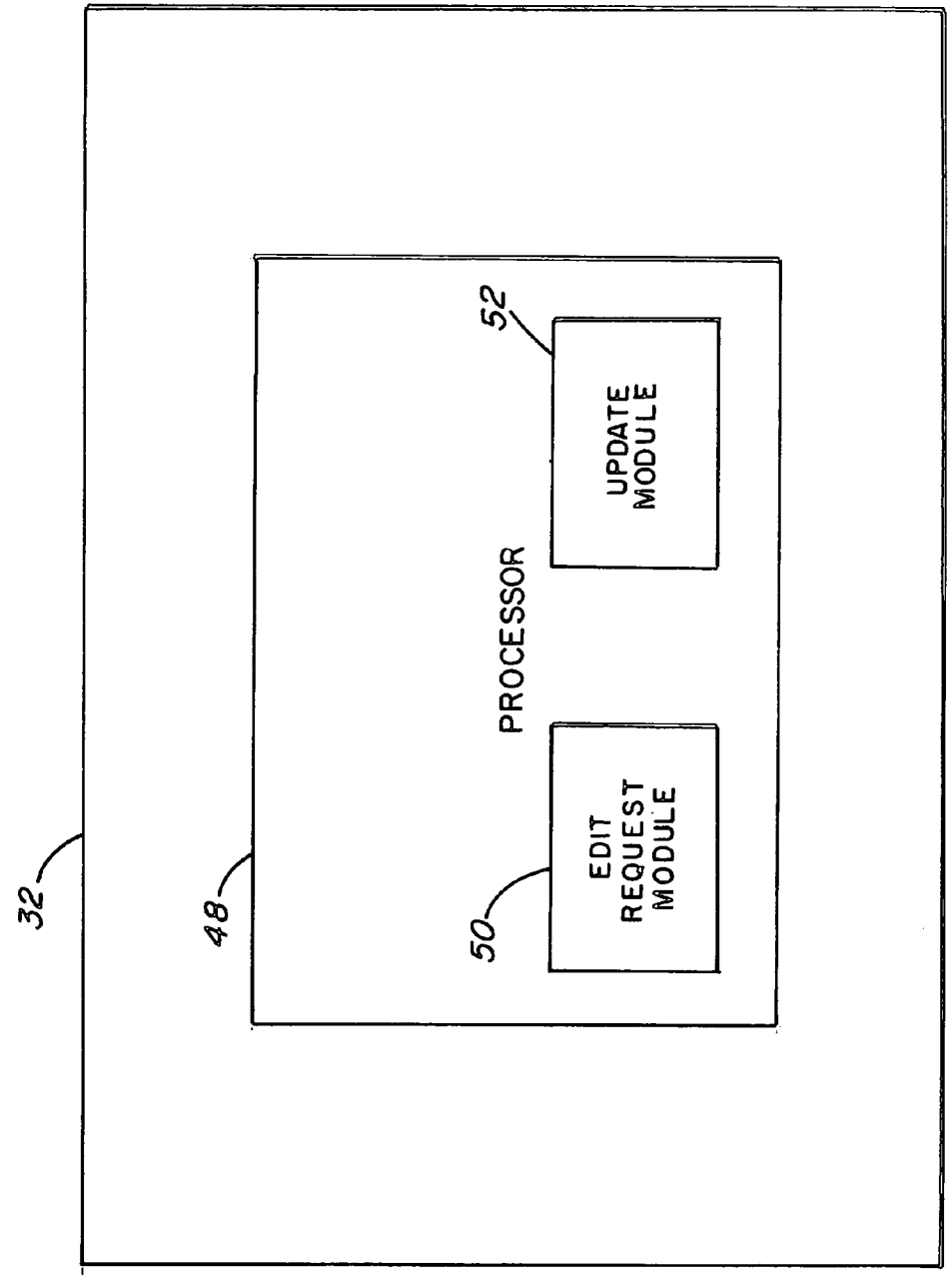
FIG. 5 illustrates one embodiment of the database machine of FIG. 3.

FIG. 5 illustrates one embodiment of the database machine 32 of FIG. 3. The database machine 32 may include a processor 48. The database machine 32 may also contain an interface to content addressable memory (CAM) (not shown) for updating information stored in the user database 34. The processor 48 may be a central processing unit (CPU) including, e.g., a microprocessor, an application specific integrated circuit (ASIC), or one or more printed circuit boards. The processor 48 may include an edit request module 50 for receiving a request to alter the profile of a user via the external network 14, and an update module 52 for altering the profile of the user.

The modules 50, 52 may be implemented as microcode configured into the logic of the processor 48, or may be implemented as programmable microcode stored in an electrically erasable programmable read only memory (EEPROM). According to another embodiment, the modules 50, 52 may be implemented as software code to be executed by the processor 48. The software code may be written in any suitable programming language using any suitable programming technique. For example, the software code may be written in C using procedural programming techniques, or in Java or C++ using object-oriented programming techniques. The software code may be stored as a series of instructions or commands on a computer readable medium, such as a random access memory (RAM) or a read only memory (ROM), a magnetic medium such as a hard-drive or a floppy disk, or an optical medium such as a CD-ROM.

Figure 6:
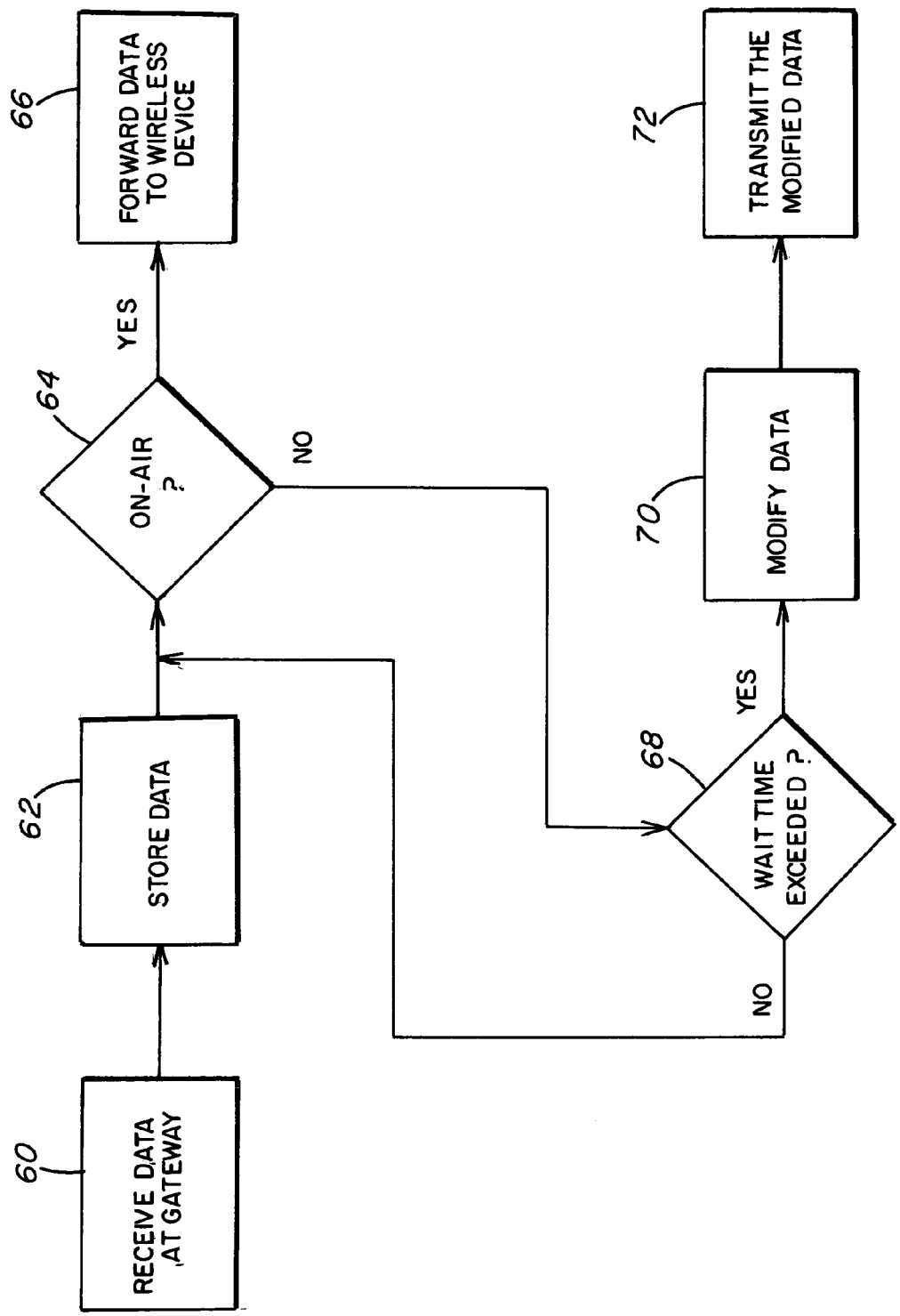
FIG. 6 illustrates a process flow according to one embodiment of the present invention.

FIG. 6 illustrates a process flow according to one embodiment of the present invention. For data such as, for example, an e-mail, to be delivered to the wireless device 18, the data may include information identifying the address of the wireless device 18 as the delivery address of the data. Such information is generally found in a header attached to the data to be sent. Accordingly, data transmitted to the wireless device 18 may include a header portion that includes the delivery address of the data. As described hereinbefore, if the wireless device 18 is turned off or is outside the coverage area of the wireless network 12, a user of the wireless device 18 will be unable to receive the data via the wireless device 18. One embodiment of the present invention may allow the user to receive the data via the end device 20 connected to the external network 14 when the wireless device 18 is not in communication with the wireless network 12.

The process begins at block 60, where data sent to a user of the wireless device 18 are received at the gateway 16. From block 60, the process proceeds to block 62, where the data are stored at the message store 28 in a mailbox associated with the user. From block 62, the process proceeds to block 64, where the gateway 16 determines whether or not the wireless device 18 is in communication with the wireless network 12 (i.e., whether the wireless device 18 is "on-air" or "off-air"). The gateway 16 may determine the status of the wireless device 18 by querying a location register associated with the wireless network 12. The location register may be a database associated with the wireless network 12, and may include information associated with the status of the wireless device 18. Such information may include, for example, whether the wireless device 18 is "on-air" or "off-air."

If the query indicates that the wireless device 18 is "on-air," the process proceeds from block 64 to block 66, where the data are forwarded from the gateway 16 to the wireless device 18. However, if the query indicates that the wireless device 18 is "off-air," the process proceeds from block 64 to block 68, where the gateway 16 determines whether the waiting time specified in the user profile maintained in the user database 34 has been exceeded.

If the waiting time has not been exceeded, the process proceeds from block 68 back to block 64, where the process proceeds as described hereinabove. If the waiting time has been exceeded, the process proceeds from block 68 to block 70, where the gateway 16 modifies the data. The gateway 16 may modify the data by changing the delivery address of the data, and the data may be modified in a variety of ways. According to one embodiment, the delivery address may be removed from the header portion of the data stored in the mailbox, and replaced with an alternate delivery address that is listed in the user profile maintained in the user database 34. According to another embodiment, a copy of the non-header portion of the data stored in the mailbox may be created, and a header including an alternate delivery address that is listed in the user profile may be attached thereto. According to another embodiment, a plurality of copies of the non-header portion of the data stored in the mailbox may be created. Thereafter, each copy may have a header attached thereto, wherein each header includes a different alternate delivery address, and wherein each alternate delivery address is listed in the user profile maintained in user database 34. From block 70, the process proceeds to block 72, where the gateway 16 transmits the modified data to the alternate delivery address indicated in the header portion of the data via the external network 14. According to one embodiment, the gateway 16 may transmit the data to a plurality of different addresses via one or more external networks 14, and the transmission of the data to the plurality of different addresses may occur simultaneously or sequentially.

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptions without departing from the scope and spirit of the present invention as defined by the appended claims.

What is claimed is:

1. An apparatus for editing a profile of a user associated with a wireless network, the apparatus comprising:
   a database machine in communication with the wireless network, wherein the database machine includes a processor, the processor including:
      an edit request module for at least receiving an electronic mail message from a user including a request to alter the profile of the user, the profile including a waiting time field corresponding to an amount of time for a corresponding wireless device to become available within the wireless network before a message is forwarded to an alternate address;
      an update module for altering the profile of the user in response to at least the electronic mail message from the user.

2. The apparatus of claim 1, wherein the database machine includes a database for storing the profile of the user.

3. The apparatus of claim 2, wherein the database has a directory structure for identifying the profile.

4. The apparatus of claim 1, wherein the profile includes a primary delivery address associated with a wireless device, and wherein the wireless device is associated with the wireless network.

5. The apparatus of claim 4, wherein the profile includes an alternate delivery address associated with the primary delivery address, wherein the alternate delivery address is associated with an external network.

6. The apparatus of claim 4, wherein the profile includes a plurality of alternate delivery addresses associated with the primary delivery address, wherein the plurality of alternate addresses are associated with an external network.

7. The apparatus of claim 5, wherein the external network is selected from the group consisting of a second wireless network, a telephone network, and the Internet.

8. The apparatus of claim 1, wherein the profile includes a waiting time.

9. An apparatus for editing a profile of a user associated with a wireless network, the apparatus comprising:
   a database machine in communication with the wireless network, wherein the database machine includes a processor, the processor including:
   means for receiving at least a request by an electronic mail message from a user including a request to alter the profile of the user, the profile including a waiting time field corresponding to an amount of time for a corresponding wireless device to become available within the wireless network before a message is forwarded to an alternate address; and
   means for altering the profile of the user.

10. A system for editing a profile of a user associated with a wireless network, the system comprising:
   a gateway in communication with the wireless network, wherein the gateway includes a database machine, the database machine including:
      a processor, wherein the processor includes:
         an edit request module for receiving at least a request by an electronic mail message from a user including a request to edit the profile of the user, the profile including a waiting time field corresponding to an amount of time for a corresponding wireless device to become available within the wireless network before a message is forwarded to an alternate address; and an update module for altering the profile of the user.

11. The system of claim 10, wherein the gateway further includes:

an internal network;

a network router connected to the internal network;

a protocol handler connected to the internal network;

a database machine connected to the internal network;

a mail router connected to the internal network; and a subsystem connected to the internal network.

12. The system of claim 11, wherein the internal network is a local are network.

13. The system of claim 11, wherein the network router is connected to the wireless network.

14. The system of claim 11, wherein the database machine includes a database for storing a profile associated with a user of the wireless network.

15. The system of claim 11, wherein the mail router is connected to an external network.

16. The system of claim 11, wherein the subsystem is connected to the external network.

17. The system of claim 16, where the subsystem is selected from the group consisting of a faxmail system, a pagemail system, a phonemail system, and an interactive voice response system.

* * * * *